Figure 1:
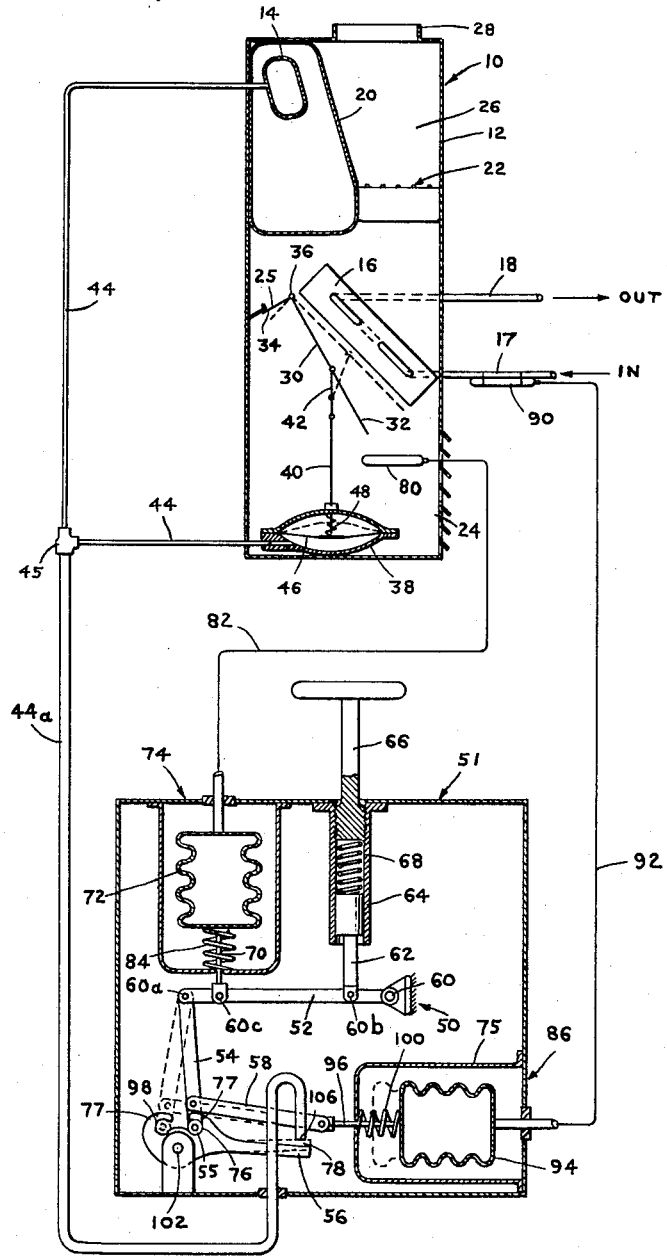

HORACE E. WOOD
INVENTOR.

BY Daniel H. Bobis
Atty

Feb. 4, 1964 H. E. WOOD 3,120,344
CONTROL MEANS FOR AN INDUCTION CIRCULATOR UNIT
Filed July 9, 1962 2 Sheets-Sheet 2

HORACE E. WOOD
INVENTOR.
BY Daniel H. Bobbs
Atty.

United States Patent Office 3,120,344
Patented Feb. 4, 1964

3,120,344
CONTROL MEANS FOR AN INDUCTION
CIRCULATOR UNIT
Horace E. Wood, Scotch Plains, N.J., assignor to
Worthington Corporation, Harrison, N.J., a corporation
of Delaware
Filed July 9, 1962, Ser. No. 208,347
2 Claims. (Cl. 236—1)

This invention relates generally to an induction circulator unit. More particularly the invention relates to control means for an induction circulator unit.

The use of induction circulators is well known in the art. However, in the prior art control means required an outside source of pressure air to operate. Furthermore, the induction circulator unit was not automatically operative responsive to changes of the temperature of the heat exchange media which required additional settings for heating or cooling operation.

It is the object of the present invention to overcome the disadvantages of the prior art by the use of the novel control means for the induction circulator unit.

In accordance with the present invention control means are provided for an induction circulator unit for a multi-room air conditioning system, said induction circulator including a casing, a plenum in said casing having discharge means and connected to a source of conditioned primary air, a heat exchange means and a bypass opening means disposed in said casing, said control means comprising:

(a) A damper means rotatably disposed in said casing and adapted to be selectively positioned to regulate the secondary air through either or both said bypass opening means and said heat exchange means, (b) Damper actuating means disposed in said casing in operative association with said damper means, (c) Conduit means connected between said plenum and said damper actuating means to supply said damper actuating means with primary air for the operation thereof, (d) Control means connected to said conduit means to regulate the amount of primary air supplied to said damper actuating means by adjustably bleeding off primary air therefrom.

One of the objects of this invention is to provide control means for an induction circulator unit to control the capacity of induction by selectively positioning damper means to direct flow of secondary air through either or both the heat exchange means and the bypass means of said induction circulator unit.

Another object of this invention is to provide control means for an induction circulator unit which are operative responsive to the primary air being supplied to the induction circulator unit.

Another object of this invention is to provide temperature control means which coact with pressure control means of the induction circulator unit.

Still another object of this invention is to provide for automatic control changeover whereby the unit is operable during either heating or cooling of the area to be conditioned.

Still another object of this invention is to provide an induction circulator unit with damper means therein which form a guide wall for the secondary air being induced therein.

Still another object of this invention is to provide an induction circulator unit which is efficiently operated.

With these and other objects in view as may appear from the accompanying specification the invention consists of various features of construction and combination of parts which will be first described in connection with the accompanying drawings which show the preferred form of the control means for the induction circulator unit and the features forming the invention will be specifically pointed out in the claims.

Figure 2:
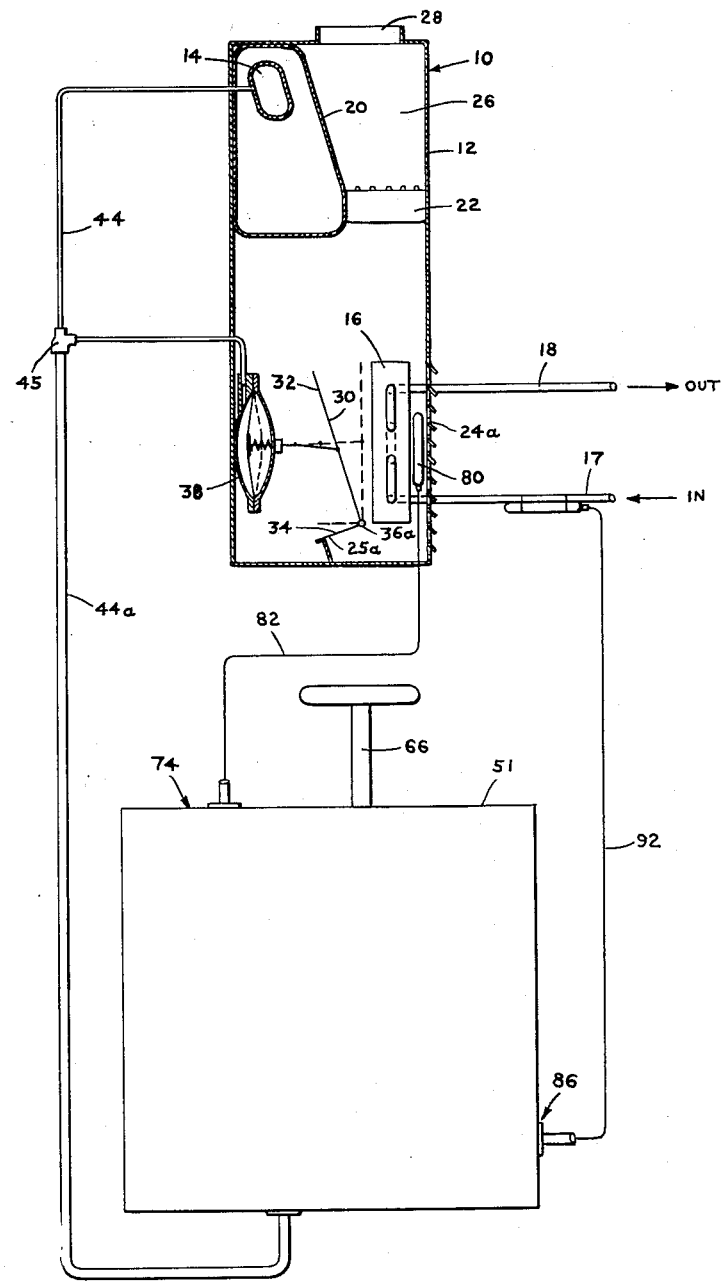

In the drawings:
FIGURE 1 is a diagrammatic view of the invention.
FIGURE 2 is another form of the invention.

Referring more particularly to the drawings, FIGURE 1 is an illustration of an induction circulator 10. The components of induction circulator unit 10 include casing 12 to which is connected duct 14 for the delivery of primary air under pressure supplied from a conveniently located central multi-room air conditioning system (not shown). Heat exchanger 16 is disposed in casing 12 and there are tubes 17 and 18 connected thereto which deliver and remove respectively heat exchange media. Plenum 20 is connected in the casing to receive primary air from duct 14 and has discharge means 22 therein.

The operation of an induction circulator unit is well known in the art and accordingly will only be briefly mentioned herein. Primary air is delivered by duct 14 into the plenum 20 to be discharged from the discharge means 22. Secondary air is induced by the discharge of the primary air to pass through the front opening 24 of the casing 12 and to be drawn through either heat exchanger 16 and/or bypass opening 25 where it passes to the mixing chamber 26 in which it will mix with the primary air and thereafter be discharged through the top opening 28 in the casing 12 into the area to be conditioned.

Damper 30 is disposed in casing 12 and has a heat exchange leg 32 and a bypass leg 34 and can be selectively positioned whereby secondary air is allowed to pass either or both the bypass opening 25 and heat exchanger 16. Damper 30 is pivotally connected to casing 12 in any suitable manner, such connection designated generally as 36.

The position of damper 30 is regulated by damper actuating motor 38 which is connected to the damper by elements 40 and will selectively position damper 30 between the position shown in FIGURE 1 and that indicated by the dotted representation thereof. Damper actuating motor 38 is operated by primary air delivered through conduit 44 which is connected thereto. The primary air acts upon diaphragm 46 whose movement is opposed by a weak spring 48 serving as a restoring force when the pressure drops in damper actuating motor 38 as described hereinafter.

Conduit 44a is an extension of conduit 44 and will bleed off primary air in a quantity determined by the position of linkage means 50 thereby controlling or regulating the position of the damper 30 corresponding to the action of primary air on diaphragm 46 of the damper actuating motor 38.

Conduit 44 is much smaller than conduit 44a and is connected thereto by a reducer 45. The reason for the difference in the size of conduits 44 and 44a is so that the quantity of air bled off will control the movement of diaphragm 46 or in other words primary air can be bled off at a faster rate than that supplied to damper actuating motor 38. It is understood that any suitable control means can be used in conduit 44 if the diameter of conduit 44 were increased for example the line would be furnished with internal friction or pinched or a suitable orifice or restriction placed therein to limit the supply of primary air to that of a lesser amount than could be bled off through conduit 44a. Furthermore an additional line can be connected between conduit 44 and motor 38 to communicate primary air to the upper side of diaphragm 46 with an orifice being placed between this line and the line communicating primary air to the lower side of diaphragm 46 thus producing a pressure drop in order that the plenum conditions do not effect movement of the diaphragm 46 which would now be independent of plenum pressure and only a function of the pressure drop across the orifice.

Linkage means 50 is disposed in control box 51 for convenience of presentation but is readily adapted to any other suitable disposition and comprises elements 52, 54, 56 and 58. Element 52 has one end pivotally connected in box 51 as at 60 and is rotatably connected at the other end to element 54 at 60a. Piston member 62 is slidably disposed in sleeve 64 of the manually adjustable temperature control 66 which uses spring 68 to force piston 62 normally outwardly, said member 62 is rotatably connected to element 52 at 60b. Element 52 is rotatably connected at 60c to shaft 70 which transmits motion thereto of flexible bellows 72 of the temperature control designated generally as 74.

Pivotal connection 60 of element 52 to control box 51 can be made as desired, for example connection 60 can be made between connections 60b and 60c and the operation of linkage means 50 would be unchanged because spring 68 would be connected in tension instead of in compression as shown.

Element 54 has a roller 55 connected at its lower end, said roller 55 is positively engaged in rounded opening 76 of element 56 by means of an integrally formed hook 77 whereby on movement of element 54 in either an upward or downward direction element 56 will be forced to move correspondingly. This movement will cause element 56 towards or away from conduit 44a so that the primary air being bled off as at 78 will be bled off in a decreased or increased amount, respectively, whereby diaphragm 46 will be positioned accordingly to readjust the position of damper 30. While a roller 55 and rounded opening have been shown to obtain the positive engagement between elements 54 and 56 it is understood that this positive connection can be obtained in any suitable manner, for example, a knife edged element adapted to fit into a corresponding knife edged opening can be used with or without a roller and or hook. Another form for example would replace the hook with spaced posts having holes therein, element 54, with or without a roller at its lower end, could have a connecting element adapted to engage in either of the spaced holes and further to prevent misalignment of this element there would be a guide pin extending through the element and the holes of the spaced posts of element 56. Thus in all the examples and any number of other possible ways a positive connection would be provided between elements 54 and 56 to allow the temperature control unit 74 to control the amount of bleed off at 78 as described more fully hereinafter. It is noted that the bleed off air is conditioned primary air which subsequently will enter the area being conditioned and though it does not induce secondary air it is nevertheless effectively used.

Temperature control unit 74 has a temperature sensing element 80 disposed in the front opening 24 of casing 12 and which senses the temperature changes therein and will signal expandable bellows 72 thereof through tubing 82 thus causing expandable bellows 72 to expand or contract dependent on whether there is a temperature increase or decrease. The signal thus transmitted will cause shaft 70 to move corresponding to the movement of bellows 72. Spring 84 acts as a restoring force and will resist slightly any expansion of bellows 72. Once the temperature control 66 has been set and the system is in balance any change in condition will be sensed by the temperature sensing element 80 thus causing bellows 72 to expand or contract accordingly. This change in balance will in turn cause element 56 to move thus changing the bleed-off rate and readjusting the damper 30 position which will provide for the system to regain balanced position by readjusting the passage of secondary air therethrough either or both the heat exchanger 16 and bypass opening 25.

Heat exchange responsive control 86 is conveniently housed in member 75 of control box 51 and temperature sensing element 90 is connected to input tube 17 whereby it will sense whether hot or cold heat exchange media is passing therethrough. The signal from temperature sensing element 90 is transmitted through tubing 92 to expandable bellows 94 having shaft 96 connected thereto. Shaft 96 is connected to element 58 which will determine whether element 54 is disposed in rounded opening 76 as shown or in rounded opening 98 as indicated by dotted lines of element 56, the operation of which will be more fully explained hereinafter. Spring 100 is disposed about shaft 96 in member 88 and is adapted to restore expandable bellows 94 to the contracted position shown. The expanded position of bellows 94 is indicated by the dotted lines.

Element 56 is connected to fulcrum 102 and positively engaged by element 54 as described hereinbefore so that the end adjacent bleed-off position 78 will be controlled by element 54 with the upwardly directed movement thereof being limited to contacting the outlet end 106 of conduit 44a.

Operation

The operation of the control means for the induction circulator unit 10 as illustrated in FIGURE 1 is as follows: Heat exchange control 86 will sense whether the temperature of the heat exchange media passing through tube 17 is hot or cold. Assuming cold media passing therein will cause expandable bellows 94 to be positioned as shown. Therefore shaft 96 and element 58 will position element 54 in rounded opening 76 of element 56. Accordingly, changes in temperature will be sensed by temperature sensing element 80 of temperature control unit 74 causing bellows 72 to move accordingly. If the temperature rises, bellows 72 will expand and move shaft 70 downwardly, forcing down element 52 and element 54 which will in turn move element 56 in the direction away from discharge 106 of conduit 44a causing an increase in the amount of primary air discharged and thus changing the position of damper 30 as the diaphragm 46 moves in a downward direction resulting in positioning damper 30 to close off bypass opening 25 and provide for the passage of all the secondary air through the heat exchanger 16 which has cool heat exchanger media passing therethrough. This in turn will cause a decrease in temperature of the conditioned area and a return to the balanced position as determined by the temperature control 66. This process will automatically operate whenever the system deviates from the setting of control 66.

If for any reason there had been a decrease in temperature the sensing element 80 would have signalled the bellows 72 to contract and the spring 84 would have positioned the bellows accordingly. This would have caused elements 52 and 54 to rise corresponding to the upward movement of shaft 70 and element 56 would be forced by element 54 to move in the direction toward discharge 106 resulting in a decrease in discharge of bleed-off of primary air and an expansion of diaphragm 46 of damper actuating motor 38 thus closing the heat exchange leg of damper 30 allowing for a decrease of passage of secondary air through heat exchange 16 and an appropriate increase in passage of secondary air through bypass opening 25. Once again this would continue until the system returned to balanced position.

Assuming that hot heat exchanger medium is passing through inlet 17 to heat exchanger 16 the following would take place: Sensing element 90 of heat exchanger responsive control 86 would signal bellows 94 and would cause bellows 94 to expand accordingly to the position indicated by the dotted lines. This would force shaft 96 and element 58 in the direction of opening 98 which has a corresponding hook 77 and would position element 54 in opening 98 as indicated by the dotted lines. When element 54 is disposed in opening 98 the expansion of bellows 72 will be transmitted through shaft 70, element 52 and element 54 to element 56 and cause the reverse action of that above described, namely, it will cause element 56 to move in the direction towards discharge 106. Accordingly, any increase in temperature will cause a lessening of bleed-off and will result in damper actuating motor 38 having the diaphragm 46 thereof expand causing damper 30 to be positioned whereby less secondary air is allowed to pass through heat exchanger 16 and a correspondingly increased amount will be passed through bypass opening 26. It is this reverse action of element 56 which will cause the system to automatically come into balance when the hot media is passing through tube 17 to heat exchanger 16.

Thus it is apparent that the control means will automatically adjust to both hot and cold operation of the induction circulator 10. This means that the unit will operate free of any settings once the initial temperature control setting 66 has been manually set. It is understood that though a manual setting is shown that an automatic device could be substituted therefor, within the scope of the present invention.

Another form of the present invention is shown in FIGURE 2 and in which the casing has a louvered front opening 24a and the temperature sensing element 80 is disposed transverse thereof. The damper actuating motor 38 has been mounted instead of on the bottom of casing 12 on the rear wall thereof. Damper 30 has the rotatable connection 36a at the bottom of heat exchanger 16 which heat exchanger is disposed in a vertical position as shown. Accordingly, the bypass opening 25a is now below heat exchanger 16. The operation of the induction circulator 10 shown in FIGURE 2 is substantially identical to that as described hereinbefore, the only difference being that now heat exchanger leg 32 of damper 30 acts as a guiding wall to direct the secondary air induced through heat exchanger 16.

It will be understood that this invention is not to be limited to the specific construction or arrangement of parts shown but that they may be widely modified within the invention defined by the claims.

What is claimed is:
1. A control means for regulating the passage of air comprising:
(a) a casing having an opening therein,
(b) a heat exchange means adjacent to and substantially covering at least one-half the opening,
(c) a damper means rotatably disposed intermediate the opening and adapted to be selectively positioned therein between the portion of the opening adjacent the heat exchange means and the portion of the opening remote therefrom to control the flow of air through either of said portions of the opening,
(d) a source of pressure air,
(e) activating means operated by the pressure air and connected to the damper means to selectively position the damper means,
(f) a variable bleed-off valve operatively associated with the activating means to regulate the position of the activating means,
(g) a movable element in the bleed-off valve, one end of which varies the amount of pressure air bled off and the other end thereof fulcrumed,
(h) the fulcrumed end of the movable element having a pair of spaced openings formed on either side of the fulcrum,
(i) a first thermomotive means including an air temperature element disposed adjacent the opening to sense the temperature of the air passing therethrough,
(j) a first linkage means connected to the first thermomotive means,
(k) the first linkage means having one end thereof engaged in one of the openings of the movable element, and to move the movable element responsive to the movement of the first thermomotive means,
(l) a second thermomotive means including a temperature sensitive element connected to the heat exchanger,
(m) a second linkage means connected to the second thermomotive means, and
(n) the second linkage means having one end thereof connected to the first linkage means and responsive the movement of the second thermomotive means to urge the first linkage means from engagement in one of the openings of the movable element into engagement in the other of said openings whereby the movement of the bleed-off end of the movable element responsive the movement of the first thermomotive means and first linkage means is reversed.

2. An induction circulator having control means therein comprising:
(a) a casing,
(b) a plenum having discharge means arranged to induce air flow through said casing,
(c) a source of conditioned primary air connected to the plenum,
(d) a heat exchanger means disposed in the casing,
(e) a bypass opening formed in the casing adjacent the heat exchange means,
(f) a damper means rotatably disposed in the casing and adapted to be selectively positioned to regulate the flow of secondary air through either or both the bypass opening and the heat exchange means,
(g) actuating means operatively associated with the damper means and operated by the conditioned primary air,
(h) a variable bleed-off valve operatively associated with the actuating means to regulate the positioning thereof,
(i) the bleed-off valve having a movable element therein, one end of which regulates the amount of conditioned primary air bled-off and the other end thereof connected to a fulcrum,
(j) the fulcrumed end of the movable element having a slot formed adjacent the fulcrum,
(k) temperature control means including an air temperature element and linkage means to position the bleed-off valve,
(l) the linkage means engaged in the slot of the movable element and to move the movable element about the fulcrum responsive the movement of the temperature control means,
(m) a heat exchange responsive control means including a temperature sensitive element and linkage means to operate responsive a predetermined variation of temperature in the heat exchange means, and
(n) the second mentioned linkage means connected to the first mentioned linkage means to selectively position the first mentioned linkage means in the slot of the movable element to reverse the movement of the movable element about the fulcrum responsive to the movement of the temperature control means whereby the bleed-off operation and the movement of the damper means will be automatically controlled within the predetermined temperature conditions of the induction circulator.

References Cited in the file of this patent

UNITED STATES PATENTS

| 1,413,073 | Thelen | Apr. 18, 1922 |
| 2,495,227 | Lum | Jan. 24, 1950 |
| 2,780,413 | Jensen | Feb. 5, 1957 |
| 2,909,043 | Baker et al. | Oct. 20, 1959 |
| 2,936,121 | Buchel et al. | May 10, 1960 |
| 2,960,269 | McGrath | Nov. 15, 1960 |
| 3,082,676 | Church et al. | Mar. 26, 1963 |
| 3,100,078 | Dreibelbis | Aug. 6, 1963 |

FOREIGN PATENTS

| 379,430 | Great Britain | Sept. 1, 1932 |